United States Patent
An et al.

(10) Patent No.: US 9,525,572 B2
(45) Date of Patent: Dec. 20, 2016

(54) SIGNAL CORRECTION METHOD AND RECEIVING MACHINE

(71) Applicant: Huawei Technologies Co., Ltd., Shenzhen (CN)

(72) Inventors: Qi An, Chengdu (CN); Yating Liu, Chengdu (CN); Meng Cai, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 32 days.

(21) Appl. No.: 14/626,461

(22) Filed: Feb. 19, 2015

(65) Prior Publication Data
US 2015/0163078 A1 Jun. 11, 2015

Related U.S. Application Data

(63) Continuation of application No. PCT/CN2012/080402, filed on Aug. 21, 2012.

(51) Int. Cl.
- *H04B 1/10* (2006.01)
- *H04L 25/03* (2006.01)
- *H04L 27/36* (2006.01)
- *H04L 1/02* (2006.01)
- *H04L 1/20* (2006.01)
- H04L 27/00 (2006.01)

(52) U.S. Cl.
CPC ........... *H04L 25/03057* (2013.01); *H04L 1/02* (2013.01); *H04L 1/20* (2013.01); *H04L 25/03* (2013.01); *H04L 27/36* (2013.01); *H04L 2027/0024* (2013.01)

(58) Field of Classification Search
CPC ............. H04L 2025/03426; H04L 1/0009; H04B 7/0413; H04B 7/0854
USPC .................................. 375/233, 260
See application file for complete search history.

(56) References Cited

U.S. PATENT DOCUMENTS

| | | | |
|---|---|---|---|
| 6,813,219 B1 | 11/2004 | Blackmon | |
| 6,819,630 B1 | 11/2004 | Blackmon et al. | |
| 2007/0092020 A1* | 4/2007 | Seki | H04L 1/0069 375/267 |
| 2007/0248196 A1 | 10/2007 | Nakao et al. | |

(Continued)

FOREIGN PATENT DOCUMENTS

| | | |
|---|---|---|
| CN | 101009511 A | 8/2007 |
| CN | 101964449 A | 2/2011 |

(Continued)

*Primary Examiner* — David S Huang
(74) *Attorney, Agent, or Firm* — Slater Matsil, LLP

(57) ABSTRACT

The present invention discloses a signal correction method and a receiving machine, pertaining to the radio communication field. The method includes: acquiring M channels of first signals; performing adaptive processing for each channel of first signals among the M channels of first signals to output M channels of first correction signals; making a decree according to the M channels of first correction signals to obtain M channels of decree results; using a decree result with a same value and with a largest quantity among the M channels of decree results as a feedback signal; receiving M channels of second signals; and separately performing adaptive processing, according to the feedback signal, for each channel of second signals among M channels of second signals to output M channels of second correction signals.

13 Claims, 6 Drawing Sheets

(56) References Cited

U.S. PATENT DOCUMENTS

| | | | |
|---|---|---|---|
| 2009/0220031 A1* | 9/2009 | Ferreol | H04L 25/0248 375/340 |
| 2010/0095180 A1 | 4/2010 | Sawai | |
| 2010/0166093 A1 | 7/2010 | Tsai et al. | |
| 2011/0279147 A1 | 11/2011 | Montalvo et al. | |
| 2011/0280291 A1 | 11/2011 | Ihm et al. | |
| 2014/0247912 A1 | 9/2014 | Lv | |

FOREIGN PATENT DOCUMENTS

| | | |
|---|---|---|
| CN | 102549994 A | 7/2012 |
| WO | 9516312 A1 | 6/1995 |
| WO | 2007041845 A1 | 4/2007 |
| WO | 2008074925 A1 | 6/2008 |

* cited by examiner

SIGNAL CORRECTION METHOD AND RECEIVING MACHINE

This application is a continuation of International Application No. PCT/CN2012/080402, filed on Aug. 21, 2012, which is hereby incorporated by reference in its entirety.

TECHNICAL FIELD

The present invention relates to the communications field, and in particular, to a signal correction method and a receiving machine.

BACKGROUND

In a digital communication system, as a communication rate increases continuously, phase noise already becomes one of important factors that affect performance of a high-speed digital communication system. With continuous development of radio technologies, application of a multi-path system, such as a MIMO (multiple-input multiple-output) and adaptive array receiving system, receives increasingly extensive attention and study and is a technology development trend in the future. At present, however, when signals in a multi-path system are corrected, a same signal correction method is simply and repeatedly used on each channel. When a used signal correction method is based on adaptive filtering, phase noise is estimated or predicted generally through training. A decision feedback manner is used in an unknown data phase, and change of a channel may cause a decision error and further affect an adaptive algorithm, leading to an output error of a part of channels among multiple channels and making subsequent processing for multiple channels of signals greatly affected.

SUMMARY

To prevent an output error of a part of channels among multiple channels from affecting subsequent processing for multiple channels of signals, embodiments of the present invention provide a signal correction method and a receiving machine. The technical solutions are as follows:

According to one aspect, a signal correction method, where the method includes: acquiring M channels of first signals, where M is a positive integer greater than 1; performing adaptive processing for each channel of first signals among the M channels of first signals to output M channels of first correction signals; making a decision according to the M channels of first correction signals to obtain M channels of decision results; use a decision result with a same value and with a largest quantity among the M channels of decision results as a feedback signal; receiving M channels of second signals; and separately performing adaptive processing, according to the feedback signal, for each channel of second signals among the M channels of second signals to output M channels of second correction signals.

In a first possible implementation manner of the first aspect, the making a decision according to the M channels of first correction signals to obtain M channels of decision results includes: separately mapping the M channels of first correction signals to a standard constellation diagram, comparing mapping points of the M channels of first correction signals with standard signal points of the standard constellation diagram, and separately selecting, from the standard constellation diagram, a signal corresponding to a standard signal point that is closest to a location of a mapping point of each channel of first correction signals as a decision result of the channel of first correction signals, so as to obtain the M channels of decision results.

In a second possible implementation manner of the first aspect, after the performing adaptive processing for each channel of first signals among the M channels of first signals to output M channels of first correction signals, the method further includes: acquiring, according to the M channels of first signals before the adaptive processing and the M channels of first correction signals after the adaptive processing, channel state parameters of M channels.

With reference to a second possible implementation manner of the first aspect, in a third possible implementation manner of the first aspect, the acquiring a feedback signal according to the M channels of decision results and the channel state parameters of the M channels includes: when no decision result with a same value and with a largest quantity exists among the M channels of decision results, selecting channel state parameters of a channel corresponding to a decision result with the largest quantity among the M channels of decision results; when a channel state parameter whose value is unique and whose value is the smallest exists in the channel state parameters of a channel corresponding to a decision result with the largest quantity among the M channels of decision results, using the decision result of the channel corresponding to the channel state parameter whose value is unique and whose value is the smallest as a feedback signal; and when no channel state parameter whose value is unique and whose value is the smallest exists in the channel state parameters of the channel corresponding to the decision result with the largest quantity among the M channels of decision results, acquiring an error vector magnitude of a channel corresponding to a decision result with the largest quantity among the M channels of decision results and using a decision result with the smallest error vector magnitude as a feedback signal.

According to a second aspect, a receiving machine, where the receiving machine includes: a receiver, configured to acquire M channels of first signals, where M is a positive integer greater than 1; an adaptive processing module, configured to perform adaptive processing for the M channels of first signals to output M channels of first correction signals; a decision module, configured to make a decision according to the M channels of first correction signals to acquire M channels of decision results; and a selecting module, configured to use a decision result with a same value and a largest quantity among the M channels of decision results as a feedback signal; where the receiver is further configured to acquire M channels of second signals; and the adaptive processing module is further configured to perform adaptive processing according to the feedback signal, for the M channels of second signals to output M channels of second correction signals.

In a first possible implementation manner of the second aspect, the decision module is specifically configured to map the M channels of first correction signals to a standard constellation diagram, compare mapping points of the M channels of first correction signals with standard signal points of the standard constellation diagram, and separately select, from the standard constellation diagram, a signal corresponding to a standard signal point that is closest to a location of a mapping point of each channel of first correction signals as a decision result of the channel of first correction signals, so as to obtain the M channels of decision results.

In a second possible implementation manner of the second aspect, the receiving machine further includes: a channel analysis module, configured to acquire, according to the M channels of first signals before the adaptive processing and the M channels of first correction signals after the adaptive processing, channel state parameters of M channels.

With reference to a second possible implementation manner of the second aspect, in a third possible implementation manner of the second aspect, the selecting module is specifically configured to, when no decision result with a same value and with a largest quantity exists among the M channels of decision results, select channel state parameters of a channel corresponding to a decision result with the largest quantity among the M channels of decision results; when a channel state parameter whose value is unique and whose value is the smallest exists in the channel state parameters of a channel corresponding to a decision result with the largest quantity among the M channels of decision results, use the decision result of the channel corresponding to the channel state parameter whose value is unique and whose value is the smallest as a feedback signal; and when no channel state parameter whose value is unique and whose value is the smallest exists in the channel state parameters of the channel corresponding to the decision result with the largest quantity among the M channels of decision results, acquire an error vector magnitude of a channel corresponding to a decision result with the largest quantity among the M channels of decision results and use a decision result with the smallest error vector magnitude as a feedback signal.

With reference to any one of the possible implementation manners of the second aspect, in a fourth possible implementation manner of the second aspect, the adaptive processing module includes: a multiplier, a first summator, a second summator, a first phase information acquiring unit, a second phase information acquiring unit and an adaptive algorithm unit, where the multiplier is connected to the first phase information acquiring unit, the first phase information acquiring unit is connected to the first summator, the first summator is connected to the second phase information acquiring unit, the first summator is further connected to the adaptive algorithm unit and the second summator, the multiplier is further connected to the adaptive algorithm unit and the second summator, and the adaptive algorithm unit is connected to the second summator.

Embodiments of the present invention provide a signal correction method and a receiving machine, where M channels of first signals are acquired, where M is a positive integer greater than 1; adaptive processing is performed for each channel of first signals among the M channels of first signals to output M channels of first correction signals; a decision is made according to the M channels of first correction signals to obtain M channels of decision results; a decision result with a same value and with a largest quantity among the M channels of decision results is used as a feedback signal; M channels of second signals are received; adaptive processing is separately performed, according to the feedback signal, for each channel of second signals among the M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
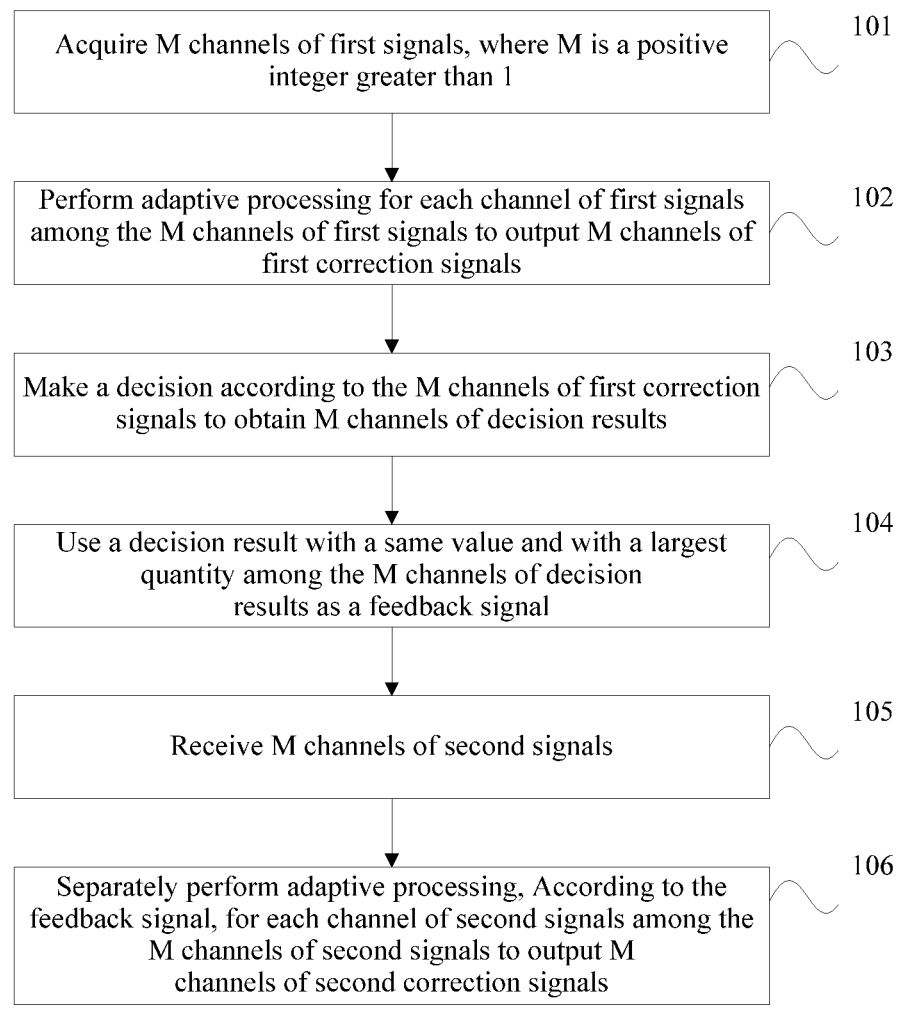
FIG. 1 is a flowchart of a signal correction method according to an embodiment of the present invention.

FIG. 1 is a flowchart of a signal correction method according to an embodiment of the present invention. Refer to FIG. 1. The embodiment specifically includes the following steps.

101. Acquire M channels of first signals, where M is a positive integer greater than 1.

102. Perform adaptive processing for each channel of first signals among the M channels of first signals to output M channels of first correction signals.

103. Make a decision according to the M channels of first correction signals to obtain M channels of decision results.

104. Use a decision result with a same value and with a largest quantity among the M channels of decision results as a feedback signal.

105. Receive M channels of second signals.

106. Separately perform adaptive processing, according to the feedback signal, for each channel of second signals among the M channels of second signals to output M channels of second correction signals.

Technical solutions of the present invention are adopted to acquire M channels of first signals, where M is a positive integer greater than 1; perform adaptive processing for each channel of first signals among the M channels of first signals to output M channels of first correction signals; make a decision according to the M channels of first correction signals to obtain M channels of decision results; use a decision result with a same value and with a largest quantity among the M channels of decision results as a feedback signal; receive M channels of second signals; and separately perform adaptive processing, according to the feedback signal, for each channel of second signals in M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission.

Figure 2:
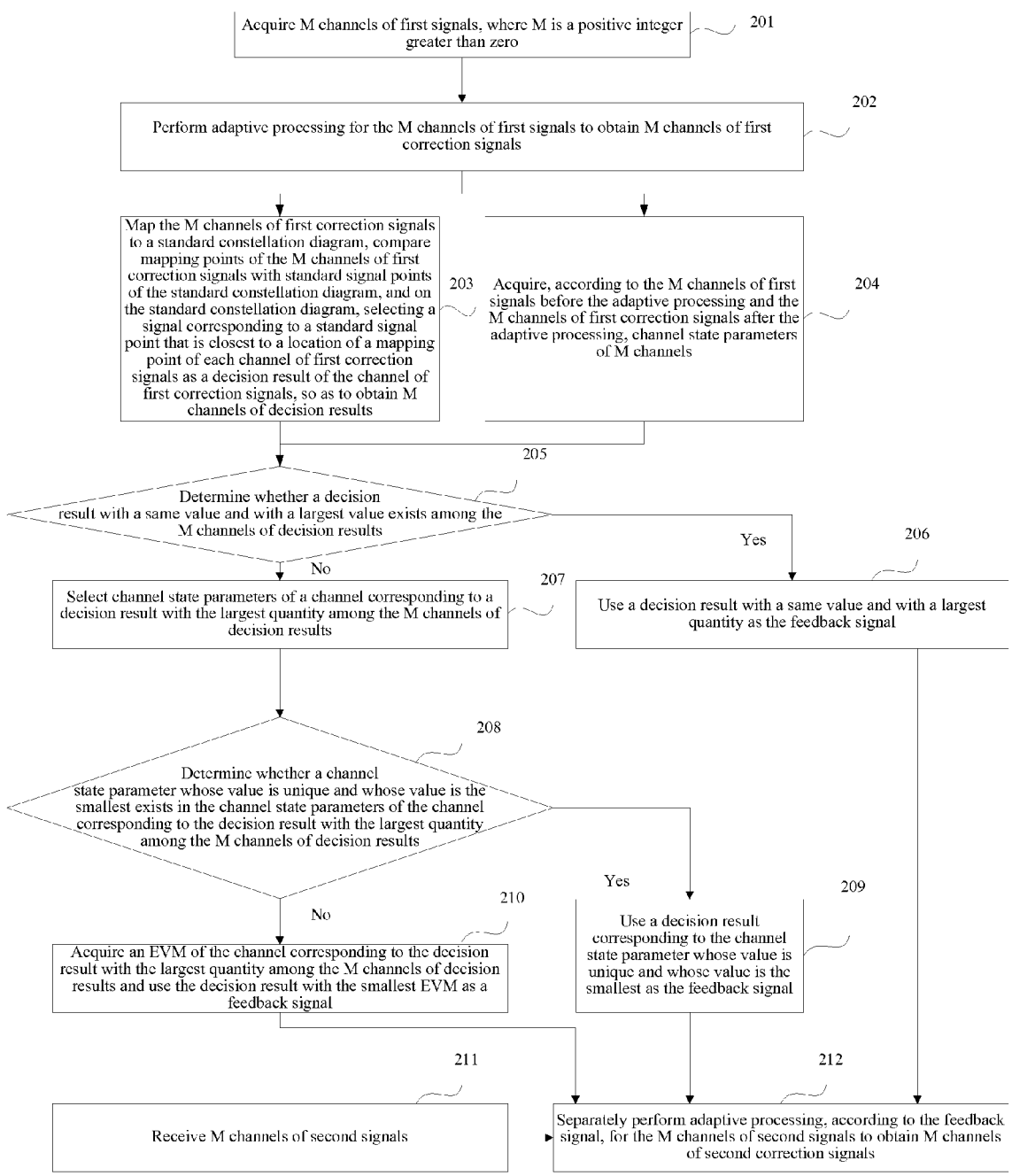
FIG. 2 is a flowchart of a signal correction method according to an embodiment of the present invention.

FIG. 2 is a flowchart of a signal correction method according to an embodiment of the present invention. Refer to FIG. 2. The embodiment specifically includes the following steps.

201. Acquire M channels of first signals, where the M is a positive integer greater than zero.

In this step, when a baseband signal sent from the sending end is received at a receiving end, after the baseband signal passes a receiving antenna and an ODU at the receiving end in sequence, the baseband processing system, such as an IDU (indoor unit, indoor unit), receives and processes the baseband signal, and performs analog-to-digital conversion and filter processing for the baseband signal to generate a first signal, where the first signal is a digital signal. However, for a multi-channel receiving machine system, all M receiving branches of the baseband processing system at the receiving end receives a baseband signal, and each receiving branch processes the baseband signal according to the foregoing process and generates the M channels of first signals.

202. Perform adaptive processing for the M channels of first signals to obtain M channels of first correction signals, and perform steps 203 and 204.

The adaptive processing is to process the first signals by using a least mean square algorithm or a recursive least square algorithm. For the first signals, the adaptive processing can use a least mean square algorithm or a recursive least square algorithm. Specific content of the foregoing two algorithms falls within the prior art, and details are not repeatedly described herein.

At an initialization stage of the receiving machine, adaptive processing for the first signal may not introduce a feedback signal. At a subsequent operation stage, adaptive processing is further performed for a currently received signal according to the feedback signal acquired according to a signal at a previous moment. The operation repeats in the way, so as to suppress phase noise to the greatest degree to obtain a corrected signal.

Preferably, when the operation stage of the receiving machine is entered into after the initialization stage of the receiving machine, and when adaptive processing is performed for each channel of first signals among the M channels of first signals, the feedback signal acquired according to the signal received before the M channels of first signals should be used for noise estimation during the adaptive processing. That is, a first feedback signal is acquired according to M channels of signals received at a previous moment, and M channels of signals received at a current moment are processed according to the first feedback signal to acquire M channels of more accurate correction signals. A second feedback signal is acquired according to the obtained M channels of correction signals, and adaptive processing should be performed, by using the second feedback signal, for M channels of signals received at a next moment, so as to achieve a purpose of adaptive processing.

203. Map the M channels of first correction signals to a standard constellation diagram, compare mapping points of the M channels of first correction signals with standard signal points of the standard constellation diagram, and on the standard constellation diagram, select a signal corresponding to a standard signal point that is closest to a location of a mapping point of each channel of first correction signals as a decision result of the channel of first correction signals, so as to obtain M channels of decision results. Perform step 205.

Processes of mapping and comparing according to the standard constellation diagram are similar to the prior art, and details are not described herein again.

204. Acquire, according to the M channels of first signals before the adaptive processing and the M channels of first correction signals after the adaptive processing, channel state parameters of M channels. Perform step 205.

Specifically, channel state parameters at least include: a SER (symbol error rate), a bit error rate, and an EVM (error vector magnitude) of a channel. Specific acquiring processes of the SER and the EVM are disclosed in the prior art and details are not described herein again.

205. Determine whether a decision result with a same value and with a largest quantity exists among the M channels of decision results. If yes, perform step 206; if no, perform step 207.

Due to different channel statuses, decision results of the M channels of first signals include multiple possibilities. On the premise that statuses of most channels are normal, it can be considered that the decision result with a same value and with a largest quantity among the M channels of decision results is a decision result with the smallest signal phase difference.

206. When a decision result with a same value and with a largest quantity exists among the M channels of decision results, use the decision result with a same value and with a largest quantity as the feedback signal.

For example, when M is an even number, if at least M/2 decision results are the same, where all of them are A, and there is only A or at least 3 results in all decision result inputs, a selected feedback signal is A; when M is an odd number, if at least (M+1)/2 decision results are the same, where all of them are A, a selected feedback signal is A; if there are at least 3 decision results in total and a decision result B that is input mostly exists, a selected feedback signal is B.

For another example, if P is regarded as a decision result and e as a bit error rate, for four channels of signals with decision results and bit error rates (P=4, e=0.4), (P=4, e=0.3), (P=4, e=0.6) and (P=3, e=0), the decision result P=4 is the decision result with a same value and with a largest quantity. Therefore, P=4 is output as a feedback signal.

207. When no decision result with a same value and with a largest quantity exists among the M channels of decision results, select channel state parameters of a channel corresponding to a decision result with the largest quantity among the M channels of decision results.

In this step, if the number of channels in which at least two input decision results C and D are located is the same, an analysis is required on the channel corresponding to the decision result with the largest quantity among the M channels of decision results, that is, an analysis is performed on the channel state parameters of the channel corresponding to the decision result with the largest quantity. Therefore, the channel state parameters of all the channels in which C and D are located are analyzed.

For example, for four channels of signals with decision results and bit error rates (P=8, e=0.4), (P=8, e=0.3), (P=4, e=0.6) and (P=4, e=0.2), there are two channels of decision results each, P=4 and P=8. A selection is further required according to channel state parameters to determine a feedback signal.

208. Determine whether a channel state parameter whose value is unique and whose value is the smallest exists in the channel state parameters of the channel corresponding to the decision result with the largest quantity among the M channels of decision results. If yes, perform step 209; if no, perform step 210.

For example, for four channels of signals with decision results and bit error rates (P=8, e=0.4), (P=8, e=0.3), (P=4, e=0.6) and (P=4, e=0.2), there are two channels of decision results each, P=4 and P=8. A selection is further required according to channel state parameters, where the channel state parameter whose value is unique and whose value is the smallest is e=0.2, and then, P=4 corresponding to e=0.2 is determined as a feedback signal.

209. Use a decision result corresponding to the channel state parameter whose value is unique and whose value is the smallest as a feedback signal.

For M channels, when no decision result with a same value and with a largest quantity exists among the M channels of decision results, select the channel (set to K, where the K is a positive integer smaller than M) corresponding to the decision result with the largest quantity among the M channels of decision results, and analyze channel state parameters of multiple channels. Specifically, the channel state parameter may be the bit error rate. By comparing the bit error rate $e_i^1$ (i=1~K) of K channels, select the decision result of the channel with the smallest $e_i^1$ to output as a feedback signal.

Based on the example in step 208, it is learned by sorting that the channel state parameter (P=4, e=0.2) has a unique value and the smallest value. Therefore, the decision result whose value is unique and whose value is the smallest is used as a feedback signal.

210. When no channel state parameter whose value is unique and whose value is the smallest exists, acquire an EVM of the channel corresponding to the decision result with the largest quantity among the M channels of decision results and use the decision result with the smallest EVM as a feedback signal.

For M channels, when no decision result with a same value and with a largest quantity exists among the M channels of decision results, select the channel corresponding to the decision result with the largest quantity. After sorting channel state parameters (bit error rate) of multiple channels, if it is learned that no decision result whose value is unique and whose value is the smallest exists but there are still P different decision results with a same bit error rate and the smallest bit error rate, select the P channels and select a decision result of a channel with the smallest EVM as a final feedback signal according to EVMs of the P channels, where the P is a positive integer smaller than M.

211. Receive M channels of second signals.

Receiving of the second signals is similar to receiving of the first signals and details are not described herein again.

212. Separately perform adaptive processing, according to the feedback signal, for the M channels of second signals to obtain M channels of second correction signals.

The adaptive processing is to process the first signals by using a least mean square algorithm or a recursive least square algorithm. For the second signals, the adaptive processing can use a least mean square algorithm or a recursive least square algorithm. Specific content of the foregoing two algorithms falls within the prior art, and details are not repeatedly described herein.

Preferably, when adaptive processing is performed for each channel of second signals among the M channels of second signals, the feedback signal acquired according to the signal received before the M channels of second signals should be used for noise estimation during the adaptive processing. That is, a first feedback signal is acquired according to M channels of signals received at a previous moment, and M channels of signals received at a current moment are processed according to the first feedback signal to acquire M channels of more accurate correction signals. A second feedback signal is acquired according to the acquired M channels of correction signals, and adaptive processing should be performed, by using the second feedback signal, for M channels of signals received at a next moment, so as to achieve a purpose of adaptive processing.

For step 202 in an embodiment of the present invention, description of adaptive processing thereof from the perspective of an algorithm may have the following formulas:

at the initialization stage, n=0, where n indicates a moment;

authentication vector $\hat{w}(n)=0$;

feedback signal: $e(0)=\theta_1(0)-\theta_2(0)=\theta(0)$;

first signal: $u(0)=[u(0)u(-1) \ldots u(-L+1)]^T=[00 \ldots 0]^T$.

For step 212 in this embodiment, description of adaptive processing thereof from the perspective of an algorithm may have the following formulas:

n=1, 2, ... ;

authentication vector update: $\hat{w}(n)=\hat{w}(n-1)+\mu u(n-1)e(n-1)$, where $\mu$ indicates a step length of adaptive processing;

expected signal estimation: $\hat{\theta}(n)=\hat{w}^H(n)u(n-1)$;

second correction signal: $y_{out}(n)=y_{in}(n) \times e^{-j\hat{\theta}(n)}$;

where, $y_{out}(n)$ indicates a second correction signal and $y_{in}(n)$ indicates a second signal;

estimated error: $e(n)=\theta_1(n)-\theta_2(n)$;

where, $\theta_1(n)$ indicates phase information of the second correction signal at the n moment and $\theta_2(n)$ indicates phase information of a feedback signal at the n moment;

input vector update: $u(n)=\hat{\theta}(n)+e(n)$, $u(n)=[u(n)u(-1) \ldots u(n-L+1)]^T$, where L indicates the number of adaptive processing taps.

Assume that n=n+1, and repeat the foregoing steps.

The foregoing steps are a process of adaptive processing performed for the second signal according to phase information $\theta_2(n)$ of the feedback signal. An embodiment of the present invention is described only by using adaptive processing for the second signal according to the feedback signal as an example. In actual operation of the receiving machine, adaptive processing is performed for a currently received signal all according to the feedback signal at a previous moment to minimize phase noise of each channel in the receiving machine.

Technical solutions of the present invention are adopted to acquire M channels of first signals, where the M is a positive integer greater than 1; perform adaptive processing for each channel of first signals among the M channels of first signals to output M channels of first correction signals; make a decision according to the M channels of first correction signals to obtain M channels of decision results; use a decision result with a same value and with a largest quantity among the M channels of decision results as a feedback signal; receive M channels of second signals; and separately perform adaptive processing, according to the feedback signal, for each channel of second signals among the M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission. Further, the feedback signal is updated continuously along with processing for a received signal at the receiving end, so that, at the receiving end, a current feedback signal can be acquired by using a received signal at a previous moment and adaptive processing can be performed for a currently received signal by using the current feedback signal, so as to acquire a correction signal of minimized phase noise. Compared with only separately making a decision and a feedback for a single channel, technical solutions of the present invention are relatively less affected by a channel change.

Figure 3:
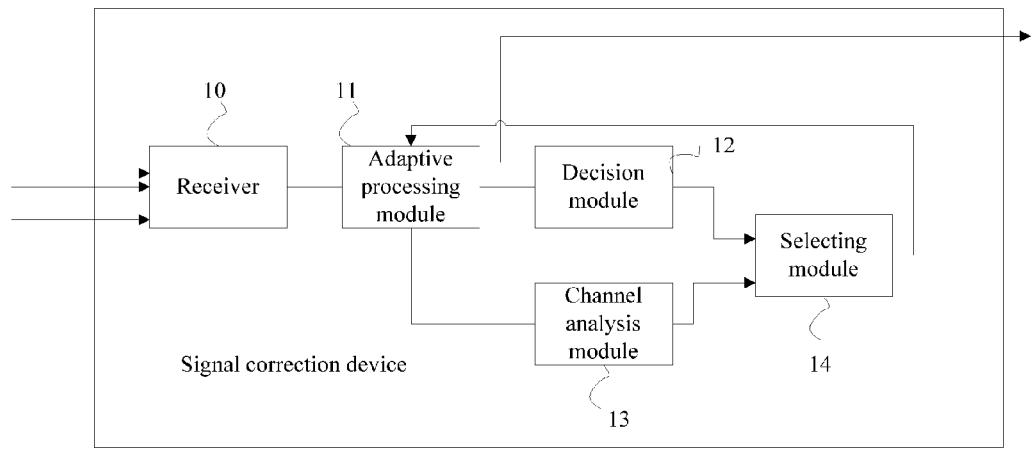
FIG. 3 is a schematic structural diagram of a receiving machine according to an embodiment of the present invention.

FIG. 3 is a schematic structural diagram of a receiving machine according to an embodiment of the present invention. The receiving machine is a receiving machine with M signal channels. Receiver 10 is configured to acquire M channels of first signals, where M is a positive integer greater than 1. Adaptive processing module 11 is configured to perform adaptive processing for the M channels of first signals to output M channels of first correction signals. Decision module 12 is configured to make a decision according to the M channels of first correction signals to obtain M channels of decision results. Selecting module 13 is configured to use a decision result with a same value and with a largest quantity among the M channels of decision results as a feedback signal. The receiver 10 is further configured to acquire M channels of second signals. The adaptive processing module 11 is further configured to perform adaptive processing, according to the feedback signal, for the M channels of second signals to output M channels of second correction signals.

Optionally, the decision module 12 is specifically configured to map the M channels of first correction signals to a standard constellation diagram, compare mapping points of the M channels of first correction signals with standard signal points of the standard constellation diagram, and separately select, from the standard constellation diagram, a signal corresponding to a standard signal point that is closest to location of a mapping point of each channel of first correction signals as a decision result of the channel of first correction signals, so as to obtain M channels of decision results.

The receiving machine further includes channel analysis module 14, which is configured to acquire, according to the M channels of first signals before the adaptive processing and the M channels of first correction signals after the adaptive processing, channel state parameters of M channels.

Optionally, the selecting module 13 is specifically configured to, when no decision result with a same value and with a largest quantity exists among the M channels of decision results, select channel state parameters of a channel corresponding to a decision result with the largest quantity among the M channels of decision results; when a channel state parameter whose value is unique and whose value is the smallest exists in the channel state parameters of a channel corresponding to a decision result with the largest quantity among the M channels of decision results, use the decision result of the channel corresponding to the channel state parameter whose value is unique and whose value is the smallest as a feedback signal; and when no channel state parameter whose value is unique and whose value is the smallest exists in the channel state parameters of the channel corresponding to the decision result with the largest quantity among the M channels of decision results, acquire an EVM of the channel corresponding to the decision result with the largest quantity among the M channels of decision results and use a decision result with the smallest EVM as a feedback signal.

Optionally, the adaptive processing module 11 is specifically configured to perform the following steps.

For a first signal in an embodiment of the present invention, description of adaptive processing thereof from the perspective of an algorithm may have the following formulas:

at the initialization stage, n=0, where n indicates a moment;

authentication vector $\hat{w}(n)=0$;

feedback signal: $e(0)=\theta_1(0)-\theta_2(0)=\theta(0)$;

first signal: $u(0)=[u(0)u(-1) \ldots u(-L+1)]^T=[00 \ldots 0]^T$.

For a second signal in an embodiment of the present invention, description of adaptive processing thereof from the perspective of an algorithm may have the following formulas:

n=1, 2, ... ;

authentication vector update: $\hat{w}(n)=\hat{w}(n-1)+\mu u(n-1)e(n-1)$, where $\mu$ indicates a step length of adaptive processing;

expected signal estimation: $\hat{\theta}(n)=\hat{w}^H(n)u(n-1)$;

second correction signal: $y_{out}(n)=y_{in}(n)\times e^{-j\hat{\theta}(n)}$;

where, $y_{out}(n)$ indicates a second correction signal and $y_{in}(n)$ indicates a second signal;

estimated error: $e(n)=\theta_1(n)-\theta_2(n)$;

where, $\theta_1(n)$ indicates phase information of the second correction signal at the n moment and $\theta_2(n)$ indicates phase information of a feedback signal at the n moment;

input vector update: $u(n)=\hat{\theta}(n)+e(n)$, $u(n)=[u(n)u(-1) \ldots u(n-L+1)]^T$, where L indicates the number of adaptive processing taps.

Assume that n=n+1, and repeat the foregoing steps.

Figure 4:
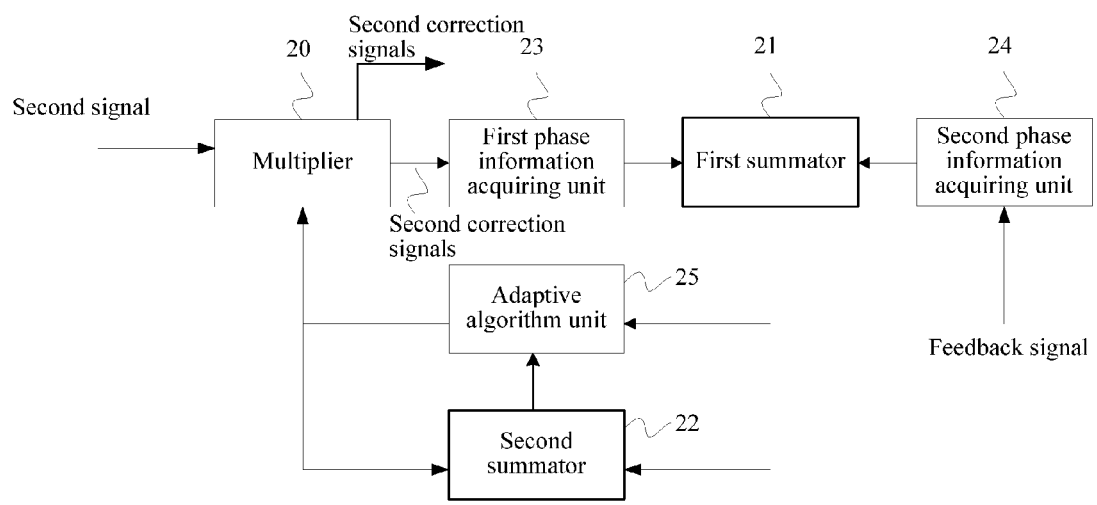
FIG. 4 is a schematic structural diagram of an adaptive processing module according to an embodiment of the present invention.

FIG. 4 is a schematic structural diagram of an adaptive processing module according to an embodiment of the present invention. The adaptive processing module includes: a multiplier 20, a first summator 21, a second summator 22, a first phase information acquiring unit 23, a second phase information acquiring unit 24 and an adaptive algorithm unit 25. The multiplier 20 is connected to the first phase information acquiring unit 23, the first phase information acquiring unit 23 is connected to the first summator 21, the first summator 21 is connected to the second phase information acquiring unit 24, the first summator 21 is further connected to the adaptive algorithm unit 25 and the second summator 22, the multiplier 20 is further connected to the adaptive algorithm unit 25 and the second summator 22, and the adaptive algorithm unit 25 is connected to the second summator 22.

The following describes adaptive processing for a second signal with reference to specific functions of the adaptive processing module and the foregoing structure. The second signal at the n moment $y_{in}(n)$ is input into the multiplier 20, and multiplied by input vector updates $u(n)=\hat{\theta}(n)+e(n)$ and $u(n)=[u(n)u(-1) \ldots u(n-L+1)]^T$, from the adaptive algorithm unit 25 and the second summator 22; the multiplier 20 outputs a second correction signal $y_{out}(n)=y_{in}(n)\times e^{-j\hat{\theta}(n)}$; the first phase information acquiring unit 23 obtains a phase angle $\theta_1(n)$ for the second correction signal at the n moment that is output by the multiplier 20; the second phase information acquiring unit 24 obtains a phase angle $\theta_2$ (n) for a feedback signal at the n moment; $\theta_2$ (n) and $\theta_1$ (n) are input into the first summator 21; the first summator 21 processes the phase angles $\theta_2$ (n) and $\theta_1$(n) to acquire an estimated error $e(n)=\theta_1(n)-\theta_2(n)$, and outputs the estimated error $e(n)=\theta_1(n)-\theta_2(n)$ to the adaptive algorithm unit 25 and the second summator 22; and the input vector updates $u(n)=\hat{\theta}(n)+e(n)$ and $u(n)=[u(n)u(-1) \ldots (n-L+1)]^T$ output by the second summator 22 are input into the adaptive algorithm unit 25, where an output of the adaptive algorithm unit 25 may be used as an input vector update of the second signal at the n+1 moment.

Technical solutions provided by the present invention may further be used for a MIMO diversity system. In the present invention, addition of an MRC (maximal ratio combining) module is required behind a selecting module, so that data flows enter the selecting module and the MRC module at the same time. Data flows after being processed by the MRC are sent for subsequent processing (such as a decoder).

The receiving machine provided by an embodiment of the present invention performs adaptive processing for each channel of first signals in M channels of first signals by acquiring the M channels of first signals, where M is a positive integer greater than 1, to output M channels of first correction signals; makes a decision according to the M channels of first correction signals to obtain M channels of decision results; uses the decision result with a same value and with a largest quantity among the M channels of decision results as a feedback signal; receives M channels of second signals; and separately performs adaptive processing, according to the feedback signal, for each channel of second signals in M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission.

The present invention further provides a receiving machine, where the receiving machine includes a receiver, which is configured to acquire signals and a processor, which is configured to perform coupling with the receiver.

The receiver is configured to acquire M channels of first signals, where M is a positive integer greater than 1; when a baseband signal sent from the sending end is received at a receiving end, after the baseband signal passes a receiving antenna and an ODU at the receiving end in sequence, the baseband processing system, such as an IDU (indoor unit), receives and processes the baseband signal, and performs analog-to-digital conversion and filter processing for the baseband signal to generate a first signal, where the first signal is a digital signal. However, for a multi-channel receiving machine system, all M receiving branches of the baseband processing system at the receiving end receives a baseband signal, and each receiving branch processes the baseband signal according to the foregoing process and generates the M channels of first signals.

The processor is configured to perform adaptive processing for each channel of first signals among the M channels of first signals to output M channels of first correction signals; where the adaptive processing is to process the first signals by using a least mean square algorithm or a recursive least square algorithm. For the first signals, the adaptive processing can use a least mean square algorithm or a recursive least square algorithm. Specific content of the foregoing two algorithms falls within the prior art, and details are not repeatedly described herein.

At an initialization stage of the receiving machine, adaptive processing for the first signal may not introduce a feedback signal. At a subsequent operation stage, adaptive processing is further performed for a currently received signal according to the feedback signal acquired according to a signal at a previous moment. The operation repeats in the way, so as to suppress phase noise to the greatest degree to obtain a corrected signal.

Preferably, when the operation stage of the receiving machine is entered into after the initialization stage of the receiving machine, and when adaptive processing is performed for each channel of first signals among the M channels of first signals, the feedback signal acquired according to the signal received before the M channels of first signals should be used for noise estimation during the adaptive processing. That is, a first feedback signal is acquired according to M channels of signals received at a previous moment, and M channels of signals received at a current moment are processed according to the first feedback signal to acquire M channels of more accurate correction signals. A second feedback signal is acquired according to the obtain M channels of correction signals, and adaptive processing should be performed, by using the second feedback signal, for M channels of signals received at a next moment, so as to achieve a purpose of adaptive processing.

For a first signal acquired by the processor in an embodiment of the present invention, description of adaptive processing thereof from the perspective of an algorithm may have the following formulas:

at the initialization stage, n=0, where n indicates a moment;

authentication vector $\hat{w}(n)=0$;

feedback signal: $e(0)=\theta_1(0)-\theta_2(0)=\theta(0)$;

first signal: $u(0)=[u(0)u(-1) \ldots u(-L+1)]^T=[00 \ldots 0]^T$.

The processor is further configured to make a decision according to the M channels of first correction signals to obtain M channels of decision results; specifically, the processor is further configured to separately map the M channels of first correction signals to a standard constellation diagram, compare mapping points of the M channels of first correction signals with standard signal points of the standard constellation diagram, and separately select, from the standard constellation diagram, a signal corresponding to a standard signal point that is closest to a location of a mapping point of each channel of first correction signals as a decision result of the channel of first correction signals, so as to obtain the M channels of decision results.

The processor is further configured to use a decision result with a same value and with a largest quantity among the M channels of decision results as a feedback signal; and due to different channel statuses, decision results of the M channels of first signals include multiple possibilities. On the premise that the statuses of most channels are normal, it can be considered that the decision result with a same value and with a largest quantity among the M channels of decision results is a decision result with the smallest signal phase difference.

The receiver is further configured to receive M channels of second signals. Receiving of the second signals is similar to receiving of the first signals and details are not described herein again.

The processor is further configured to separately perform adaptive processing, according to the feedback signal, for each channel of second signals among the M channels of second signals to output M channels of second correction signals. The adaptive processing is to process the first signals by using a least mean square algorithm or a recursive least square algorithm. For the second signal, the adaptive processing can use a least mean square algorithm or a recursive least square algorithm. Specific content of the foregoing two algorithms falls within the prior art, and details are not repeatedly described herein.

Preferably, when adaptive processing is performed for each channel of second signals among the M channels of second signals, the feedback signal acquired according to the signal received before the M channels of second signals should be used for noise estimation during the adaptive processing. That is, a first feedback signal is acquired according to M channels of signals received at a previous moment, and M channels of signals received at a current moment are processed according to the first feedback signal to acquire M channels of more accurate correction signals. A second feedback signal is acquired according to the obtained M channels of correction signals, and adaptive processing should be performed, by using the second feedback signal, for M channels of signals received at a next moment, so as to achieve a purpose of adaptive processing.

For each channel of second signals in an embodiment of the present invention, description of adaptive processing thereof from the perspective of an algorithm may have the following formulas:

n=1, 2, . . . ;

authentication vector update: $\hat{w}(n)=\hat{w}(n-1)+\mu u(n+1)e(n-1)$, where $\mu$ indicates a step length of adaptive processing;

expected signal estimation: $\hat{\theta}(n)=\hat{w}^H(n)u(n+1)$;

second correction signal: $y_{out}(n)=y_{in}(n) \times e^{-j\hat{\theta}(n)}$;

where, $y_{out}(n)$ indicates a second correction signal and $y_{in}(n)$ indicates a second signal;

estimated error: $e(n)=\theta_1(n)-\theta_2(n)$;

where, $\theta_1(n)$ indicates phase information of the second correction signal at the n moment and $\theta_2(n)$ indicates phase information of a feedback signal at the n moment;

input vector update: $u(n)=\hat{\theta}(n)+e(n)$, $u(n)=[u(n)u(-1) \ldots u(n-L+1)]^T$, where L indicates the number of adaptive processing taps.

Assume that n=n+1, and repeat the foregoing steps.

The foregoing steps are a process of adaptive processing performed for the second signal according to phase information $\theta_2(n)$ of the feedback signal. An embodiment of the present invention is described only by using adaptive processing for the second signal according to the feedback signal as an example. In actual operation of the receiving machine, adaptive processing is performed for a currently received signal all according to the feedback signal at a previous moment to minimize phase noise of each channel in the receiving machine.

Specifically, the processor is further configured to acquire, according to the M channels of first signals before the adaptive processing and the M channels of first correction signals after the adaptive processing, channel state parameters of M channels. Specifically, channel state parameters at least include: a SER (symbol error rate, symbol error rate), a bit error rate, and an EVM (error vector magnitude, error vector magnitude) of a channel. Specific acquiring processes of the SER and the EVM are disclosed in the prior art and details are not described herein again.

Specifically, the processor is further configured to, when no decision result with a same value and with a largest quantity exists among the M channels of decision results, select channel state parameters of a channel corresponding to a decision result with the largest quantity among the M channels of decision results; and need to analyze the channel corresponding to the decision result with the largest quantity among the M channels of decision results if the number of channels in which at least two input decision results C and D are located is the same, that is, analyze the channel state parameter of the channel corresponding to a decision result with the largest quantity, and then analyze channel state parameters of all channels in which C and D are located.

When the channel state parameter whose value is unique and whose value is the smallest exists in the channel state parameters of the channel corresponding to the decision result with the largest quantity among the M channels of decision results, a decision result of a channel corresponding to a channel state parameter whose value is unique and whose value is the smallest is used as a feedback signal; and for M channels, when no decision result with a same value and with a largest quantity exists among the M channels of decision results, the channel (set to K, where the K is a positive integer smaller than M) corresponding to the decision result with the largest quantity among the M channels of decision results is selected, and channel state parameters of multiple channels are analyzed. Specifically, the channel state parameter may be the bit error rate. By comparing the bit error rate $e_i^1$ (i=1~K) of K channels, the decision result of the channel with the smallest $e_i^1$ is selected to output as a feedback signal.

When no channel state parameter whose value is unique and whose value is the smallest exists in the channel state parameters of the channel corresponding to the decision result with the largest quantity among the M channels of decision results, an EVM of the channel corresponding to the decision result with the largest quantity among the M channels of decision results is acquired, and the decision result with the smallest EVM is used as a feedback signal. For M channels, when no decision result with a same value and with a largest quantity exists among the M channels of decision results, the channel corresponding to the decision result with the largest quantity is selected. After channel state parameters (bit error rate) of multiple channels are sorted, if it is learned that no decision result whose value is unique and whose value is the smallest exists but there are still P different decision results with a same bit error rate and the smallest bit error rate, the P channels are selected and a decision result of a channel with the smallest EVM is selected as a final feedback signal according to EVMs of the P channels.

Refer to FIG. 4. The processor includes an adaptive processing module, where the adaptive processing module includes: a multiplier 20, a first summator 21, a second summator 22, a first phase information acquiring unit 23, a second phase information acquiring unit 24 and an adaptive algorithm unit 25. The multiplier 20 is connected to the first phase information acquiring unit 23, the first phase information acquiring unit 23 is connected to the first summator 21, the first summator 21 is connected to the second phase information acquiring unit 24, the first summator 21 is further connected to the adaptive algorithm unit 25 and the second summator 22, the multiplier 20 is further connected to the adaptive algorithm unit 25 and the second summator 22, and the adaptive algorithm unit 25 is connected to the second summator 22. The following describes adaptive processing for a second signal with reference to specific functions of the adaptive processing module and the foregoing structure: The second signal at the n moment $y_{in}(n)$ is input into the multiplier 20, and multiplied by input vector updates $u(n)=\hat{\theta}(n)+e(n)$ and $u(n)=[u(n)u(-1) \ldots u(n-L+1)]^T$, from the adaptive algorithm unit 25 and the second summator 22; the multiplier 20 outputs a second correction signal $y_{out}(n)=y_{in}(n)\times e^{-j\hat{\theta}(n)}$; the first phase information acquiring unit 23 obtains a phase angle $\theta_n(n)$ for the second correction signal at the n moment that is output by the multiplier 20; the second phase information acquiring unit 24 obtains a phase angle $\theta_2(n)$ for a feedback signal at the n moment; $\theta_2(n)$ and $\theta_1(n)$ are input into the first summator 20; the summator 21 processes the phase angles $\theta_2(n)$ and $\theta_1(n)$ to acquire an estimated error $e(n)=\theta_1(n)-\theta_2(n)$, and outputs the estimated error $e(n)=\theta_1(n)-\theta_2(n)$ to the adaptive algorithm unit 25 and the second summator 22; and the input vector updates $u(n)=\hat{\theta}(n)+e(n)$ and $u(n)=[u(n)u(-1) \ldots u(n-L+1)]^T$ output by the second summator 22 are input into the adaptive algorithm unit 25, where an output of the adaptive algorithm unit 25 may be used as an input vector update of the second signal at the n+1 moment.

The receiving machine provided by an embodiment of the present invention performs adaptive processing for each channel of first signals among the M channels of first signals by acquiring the M channels of first signals, where M is a positive integer greater than 1, to output M channels of first correction signals; makes a decision according to the M channels of first correction signals to obtain M channels of decision results; uses the decision result with a same value and with a largest quantity among the M channels of decision results as a feedback signal; receives M channels of second signals; and separately performs adaptive processing, according to the feedback signal, for each channel of second signals among the M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission.

Figure 5:
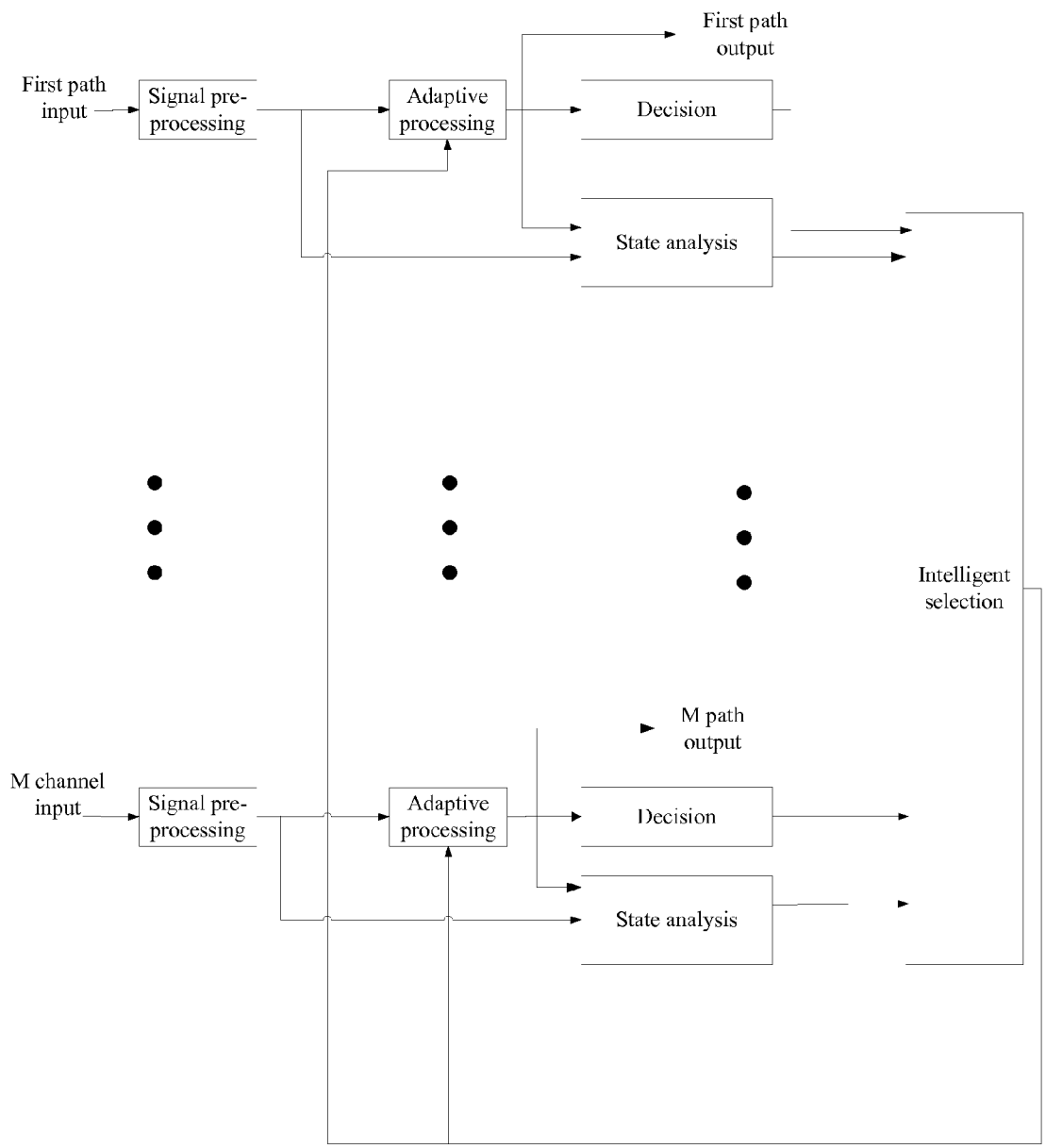
FIG. 5 is a schematic diagram of signal processing of a multi-channel system according to an embodiment of the present invention.

The following uses a multi-channel system as an example for description. Refer to FIG. 5. FIG. 5 is a schematic diagram of signal processing of a multi-channel system according to an embodiment of the present invention.

All M receiving branches of the baseband processing system at the receiving end receives a baseband signal, and each receiving branch preprocesses the baseband signal according to a specific process in step 201 to generate M channels of first signals. The receiving machine processes the M channels of first signals, acquires a feedback signal according to the M channels of first signals, performs, by using the feedback signal, adaptive processing for a second signal received subsequently, and obtains a second correction signal through the adaptive processing. An embodiment of the present invention describes only a process in which the feedback signal is generated according to the first signal. In an actual system, when the second correction signal is acquired, on each channel, processes of a decision, a state analysis and a selection are performed for the second correction signal just like for the first correction signal, and a feedback signal at a next moment is generated according to the M channels of second correction signals, so that the system can acquire relatively accurate decision results according to actual situations of multiple channels of signals, and normal signal processing of the system is not affected by a single event such as a sudden channel change or a decision error, ensuring effectiveness of transmission.

Figure 6:
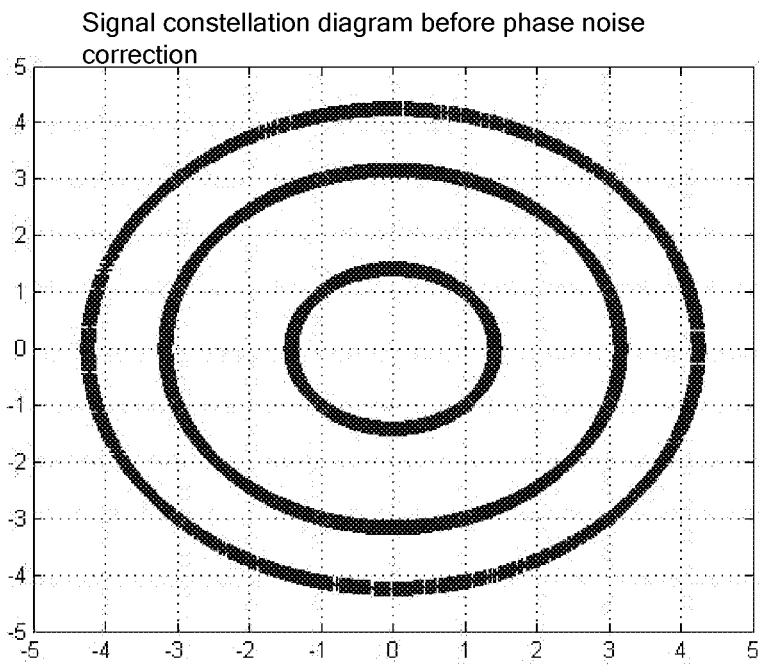
FIG. 6 is a constellation diagram before correction at a receiving end.
Figure 7:
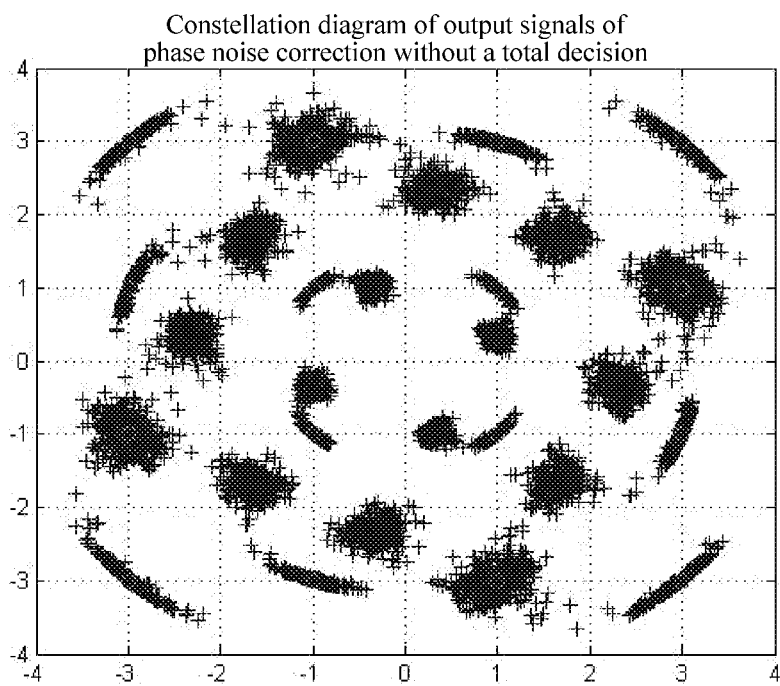
FIG. 7 is a constellation diagram after correction by using a traditional algorithm.
Figure 8:
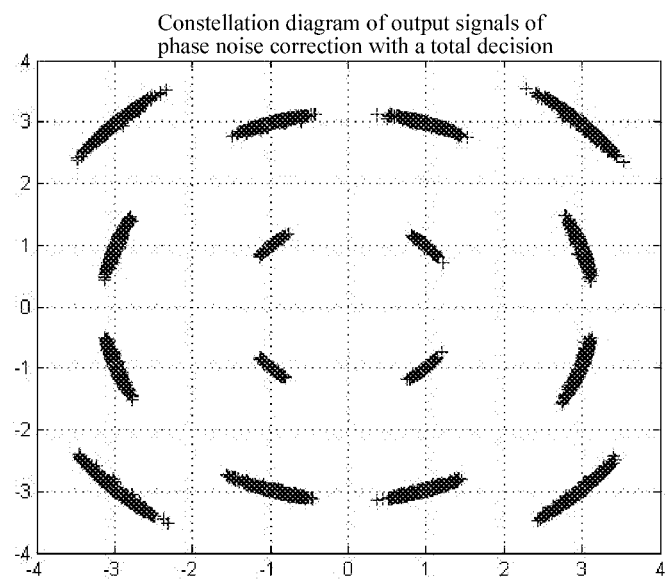
FIG. 8 is a constellation diagram after correction by using a technical solution in the present invention.
Figure 9:
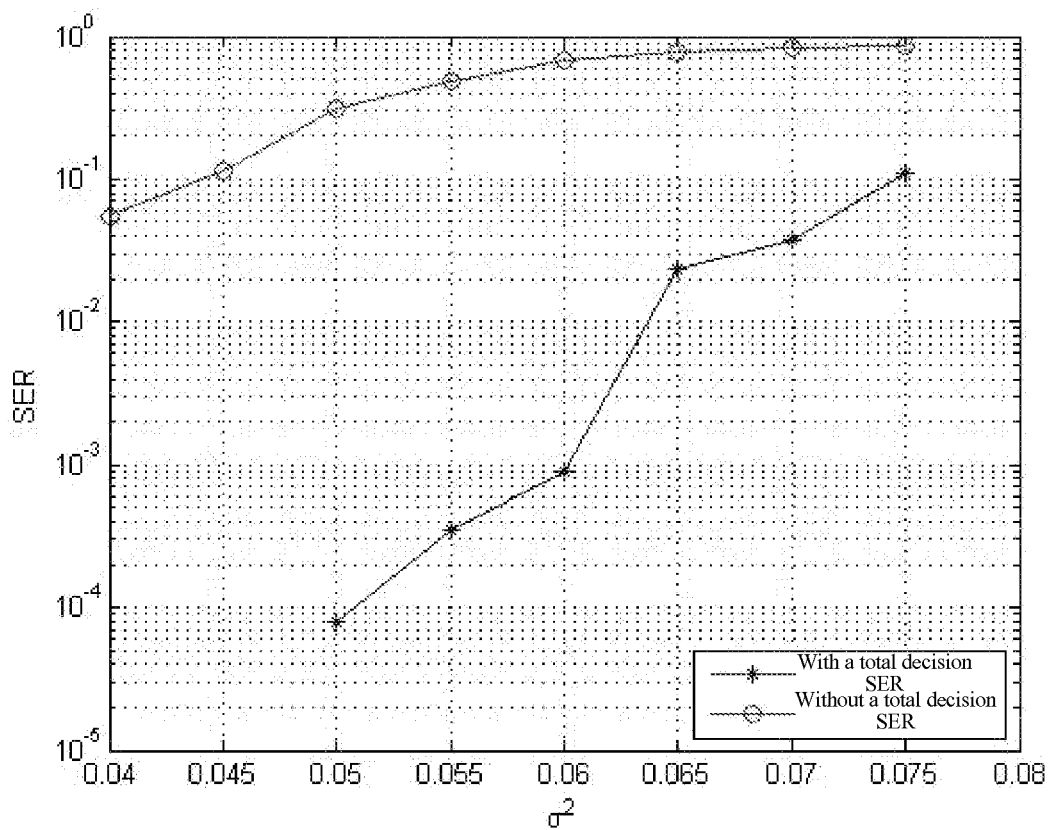
FIG. 9 is a diagram of a comparison between a SER of a traditional algorithm and a SER using a technical solution in the present invention.

Technical solutions of the present invention are adopted to acquire M channels of first signals, where the M is a positive integer greater than 1; perform adaptive processing for each channel of first signals among the M channels of first signals to output M channels of first correction signals; make a decision according to the M channels of first correction signals to acquire M channels of decision results; use a decision result with a same value and with a largest quantity among the M channels of decision results as a feedback signal; receive M channels of second signals; and separately perform adaptive processing, according to the feedback signal, for each channel of second signals among the M channels of second signals to output M channels of second correction signals. Technical solutions of the present invention are adopted to make a decision according to multiple channels of signals at a receiving end, acquire a feedback signal according to multiple channels of decision results, and separately perform adaptive processing for each channel of second signals by using the feedback signal in a subsequent receiving process, preventing an output error of a single channel from affecting subsequent processing for the multiple channels of signals, and improving stability of transmission. To further describe beneficial effects of the present invention, the following compares a SER (Symbol error rate, symbol error rate) in a traditional algorithm with the SER in technical solutions of the present invention. FIG. 6 is a constellation diagram before correction at the receiving end, FIG. 7 is a constellation diagram (after correction by using a traditional algorithm), FIG. 8 is a constellation diagram after correction by using a technical solution in the present invention, and FIG. 9 is a diagram of a comparison between a SER of a traditional algorithm and a SER using a technical solution in the present invention. The SER with a total decision is a technical solution of the present invention. Performance is improved obviously when the technical solution of the present invention is used. In particular, in a situation in which phase noise is relatively little, the SER can be greatly reduced (by at least 2 orders of magnitude) by using the technical solution of the present invention.

It should be noted that the receiving machine provided by an embodiment of the present invention is configured for a same-signal coherence accumulation system, that is, a system in which multiple channels transmit same signals and coherence accumulation is performed at the receiving end.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present invention, but are not intended to limit the present invention. Any modification, equivalent replacement or improvement derived without departing from the principle of the present invention shall all fall within the protection scope of the present invention.

What is claimed is:
1. A signal correction method, comprising:
   acquiring M channels of first signals, wherein M is a positive integer greater than 1;
   performing adaptive processing for each channel of first signals among the M channels of first signals to output M channels of first correction signals;

making a decision according to the M channels of first correction signals to obtain M channels of decision results;

using a decision result with a most common identical value among the M channels of decision results as a feedback signal, wherein selecting the most common identical value comprises:

in response to the decision results of the m channels having a single most common identical value, selecting the single most common identical value as the most common identical value; and in response to the decision results of the m channels having a plurality of values that each occur a same largest number of times, selecting one of the plurality of values as the most common identical value;

receiving M channels of second signals; and separately performing adaptive processing, according to the feedback signal, for each channel of second signals among the M channels of second signals to output M channels of second correction signals.

2. The method according to claim 1, wherein making the decision according to the M channels of first correction signals to obtain M channels of decision results comprises separately mapping the M channels of first correction signals to a standard constellation diagram, comparing mapping points of the M channels of first correction signals with standard signal points of the standard constellation diagram, and separately selecting, from the standard constellation diagram, a signal corresponding to a standard signal point that is closest to a location of a mapping point of each channel of first correction signals as a decision result of the channel of first correction signals, so as to obtain the M channels of decision results.

3. The method according to claim 1, wherein after performing the adaptive processing for each channel of first signals among the M channels of first signals to output M channels of first correction signals, the method further comprises acquiring, according to the M channels of first signals before the adaptive processing and the M channels of first correction signals after the adaptive processing, channel state parameters of M channels.

4. The method according to claim 3, wherein there is a plurality of values that each occur a same largest number of times and wherein the feedback signal is obtained according to the M channels of decision results and the channel state parameters of the M channels by:

selecting channel state parameters of a channel corresponding to a decision result with a value in the plurality of values;

using a decision result of a channel corresponding to a channel state parameter whose value is unique and whose value is the smallest as the feedback signal when a channel state parameter whose value is unique and whose value is the smallest exists among the channel state parameters of the channel corresponding to the decision result with the value in the plurality of values; and acquiring an error vector magnitude of a channel corresponding to a decision result with value in the plurality of values and using a decision result with the smallest error vector magnitude as the feedback signal when no channel state parameter whose value is unique and whose value is the smallest exists among the channel state parameters of the channel corresponding to the decision result with the value in the plurality of values.

5. A receiving machine, comprising:

a receiver, configured to acquire M channels of first signals, wherein M is a positive integer greater than 1;

an adaptive processing module, configured to perform adaptive processing for the M channels of first signals to output M channels of first correction signals;

a decision module, configured to make a decision according to the M channels of first correction signals to obtain M channels of decision results; and a selecting module, configured to use a decision result with a most common identical value among the M channels of decision results as a feedback signal, wherein selecting the most common identical value comprises:

in response to the decision results of the m channels having a single most common identical value, selecting the single most common identical value as the most common identical value; and in response to the decision results of the m channels having a plurality of values that each occur a same largest number of times, selecting one of the plurality of values as the most common identical value;

wherein the receiver is further configured to acquire M channels of second signals; and wherein the adaptive processing module is further configured to perform adaptive processing, according to the feedback signal, for the M channels of second signals to output M channels of second correction signals.

6. The receiving machine according to claim 5, wherein the decision module is configured to map the M channels of first correction signals to a standard constellation diagram, compare mapping points of the M channels of first correction signals with standard signal points of the standard constellation diagram, and separately select, from the standard constellation diagram, a signal corresponding to a standard signal point that is closest to a location of a mapping point of each channel of first correction signals as a decision result of the channel of first correction signals, so as to obtain M channels of decision results.

7. The receiving machine according to claim 6, wherein the receiving machine further comprises a channel analysis module, configured to acquire, according to the M channels of first signals before the adaptive processing and the M channels of first correction signals after the adaptive processing, channel state parameters of M channels.

8. The receiving machine according to claim 7, wherein there is a plurality of values that each occur a same largest number of times and wherein the selecting module is specifically configured to select channel state parameters of a channel corresponding to a decision result with a value in the plurality of values;

when a channel state parameter whose value is unique and whose value is the smallest exists in the channel state parameters of a channel corresponding to a decision result with a value in the plurality of values, use the decision result of the channel corresponding to the channel state parameter whose value is unique and whose value is the smallest as a feedback signal; and when no channel state parameter whose value is unique and whose value is the smallest exists in the channel state parameters of a channel corresponding to a decision result with a value in the plurality of values, acquire an error vector magnitude of the channel corresponding to the decision result with a value in the plurality of values and use a decision result with the smallest error vector magnitude as a feedback signal.

9. The receiving machine according to claim 5, wherein the adaptive processing module comprises a multiplier, a first summator, a second summator, a first phase information acquiring unit, a second phase information acquiring unit and an adaptive algorithm unit, wherein the multiplier is connected to the first phase information acquiring unit, the first phase information acquiring unit is connected to the first summator, the first summator is connected to the second phase information acquiring unit, the first summator is further connected to the adaptive algorithm unit and the second summator, the multiplier is further connected to the adaptive algorithm unit and the second summator, and the adaptive algorithm unit is connected to the second summator.

10. A device comprising:
a processor; and
a computer-readable storage medium storing a program to be executed by the processor, the program including instructions for:
  acquiring M channels of first signals, wherein M is a positive integer greater than 1;
  performing adaptive processing for each channel of first signals among the M channels of first signals to output M channels of first correction signals;
  making a decision according to the M channels of first correction signals to obtain M channels of decision results;
  using a decision result with a most common identical value among the M channels of decision results as a feedback signal, wherein selecting the most common identical value comprises:
    in response to the decision results of the m channels having a single most common identical value, selecting the single most common identical value as the most common identical value; and
    in response to the decision results of the m channels having a plurality of values that each occur a same largest number of times, selecting one of the plurality of values as the most common identical value;
  receiving M channels of second signals; and
  separately performing adaptive processing, according to the feedback signal, for each channel of second signals among the M channels of second signals to output M channels of second correction signals.

11. The device according to claim 10, wherein making the decision according to the M channels of first correction signals to obtain M channels of decision results comprises separately mapping the M channels of first correction signals to a standard constellation diagram, comparing mapping points of the M channels of first correction signals with standard signal points of the standard constellation diagram, and separately selecting, from the standard constellation diagram, a signal corresponding to a standard signal point that is closest to a location of a mapping point of each channel of first correction signals as a decision result of the channel of first correction signals, so as to obtain the M channels of decision results.

12. The device according to claim 10, wherein after performing the adaptive processing for each channel of first signals among the M channels of first signals to output M channels of first correction signals, the program includes further instructions for acquiring, according to the M channels of first signals before the adaptive processing and the M channels of first correction signals after the adaptive processing, channel state parameters of M channels.

13. The device according to claim 12, wherein there is a plurality of values that each occur a same largest number of times and wherein the feedback signal is obtained according to the M channels of decision results and the channel state parameters of the M channels by:
  selecting channel state parameters of a channel corresponding to a decision result with a value in the plurality of values;
  using a decision result of a channel corresponding to a channel state parameter whose value is unique and whose value is the smallest as the feedback signal when a channel state parameter whose value is unique and whose value is the smallest exists among the channel state parameters of the channel corresponding to the decision result with a value in the plurality of values; and
  acquiring an error vector magnitude of a channel corresponding to a decision result with a value in the plurality of values and using a decision result with the smallest error vector magnitude as the feedback signal when no channel state parameter whose value is unique and whose value is the smallest exists among the channel state parameters of the channel corresponding to the decision result with a value in the plurality of values.

* * * * *